UNITED STATES PATENT OFFICE.

JOHN S. RAMSBURGH, OF NEW MARKET, MARYLAND.

IMPROVED FERTILIZER.

Specification forming part of Letters Patent No. 77,840, dated May 12, 1868.

*To all whom it may concern:*

Be it known that I, JOHN S. RAMSBURGH, of New Market, in the county of Frederick and State of Maryland, have invented a new and Improved Method of Ammoniaizing Superphosphate of Lime; and I do hereby declare that the following is a full, clear, and exact description thereof, which will enable those skilled in the art to make and use the same.

This invention relates to a class of fertilizers much used at the present time, and with great success, being known in commerce as the "superphosphate of lime," the most important and valuable feature of which is the ammonia contained in it.

The ammonia, being of a very volatile nature, and not chemically combined or fixed in the composition, evaporates to a greater or less extent when exposed to the atmosphere, the composition losing to that extent its fertilizing qualities.

To not only prevent this evaporation and loss, but to charge the superphosphate with an additional supply of ammonia, thereby greatly increasing its value as a fertilizer, is the object of this invention.

With the object in view of discovering the proper substances and proportions, and a process by which the ammonia might be fixed or chemically combined in increased quantity, I have been led into a long course of experiments, which have resulted in entire success, producing a most valuable fertilizer, so cheap that it is placed within the reach of all.

In carrying out my invention and discovery, I proceed as follows, confining myself as nearly as may be to the proportions named, and to the manner of combining or mixing the ingredients: With one hundred pounds of calcined bone I mix twenty-five pounds of sulphate of ammonia, over which I pour three gallons of boiling water or barn-yard liquor. Twenty-five pounds of sulphuric acid are now added, and an ammoniated superphosphate of lime is formed. This, while in a hot state, is poured into a "mixing-box," and combined with sixty pounds of sulphate of soda, one hundred and twenty-five pounds of sulphate of lime, and one hundred and fifty pounds of slaked ashes or muck, when the whole mass is thrown into a pile to pulverize, and is ready for use in a few days.

Having thus described my invention, I claim as new and desire to secure by Letters Patent—

The compound for a fertilizer composed of the ingredients, mixed in the manner and proportions substantially as herein described.

JOHN S. RAMSBURGH.

Witnesses:
CHARLES WOOD,
MILTON MEALEY.